Aug. 23, 1932.  B. D. SCOTT  1,873,493
STALL FOR ANIMALS
Filed May 13, 1931  2 Sheets-Sheet 2

Inventor

Patented Aug. 23, 1932

1,873,493

UNITED STATES PATENT OFFICE

BERTRAM D. SCOTT, OF FAIRFIELD, IOWA, ASSIGNOR TO THE LOUDEN MACHINERY COMPANY, OF FAIRFIELD, IOWA, A CORPORATION OF IOWA

STALL FOR ANIMALS

Application filed May 13, 1931. Serial No. 536,969.

My invention relates to improvements in animal stalls, particularly to the type where the animal enters the stall at the rear thereof and passes out of the same through the front, these stalls being especially adapted for confining the animal while it is being milked.

The object of the invention is to provide a stall having a gate at the front thereof which may be opened and closed by an operator in the rear of the stall.

Another object of the invention is to provide a stall having a gate at the front thereof, which is held in closed position by latching means located in the rear of the stall accessible to the operator.

Other objects and improvements will appear from a consideration of the following description, together with the accompanying drawings in which, Fig. 1 is a perspective view of two stalls, the gate of one being in open position and the other closed.

Figure 1:
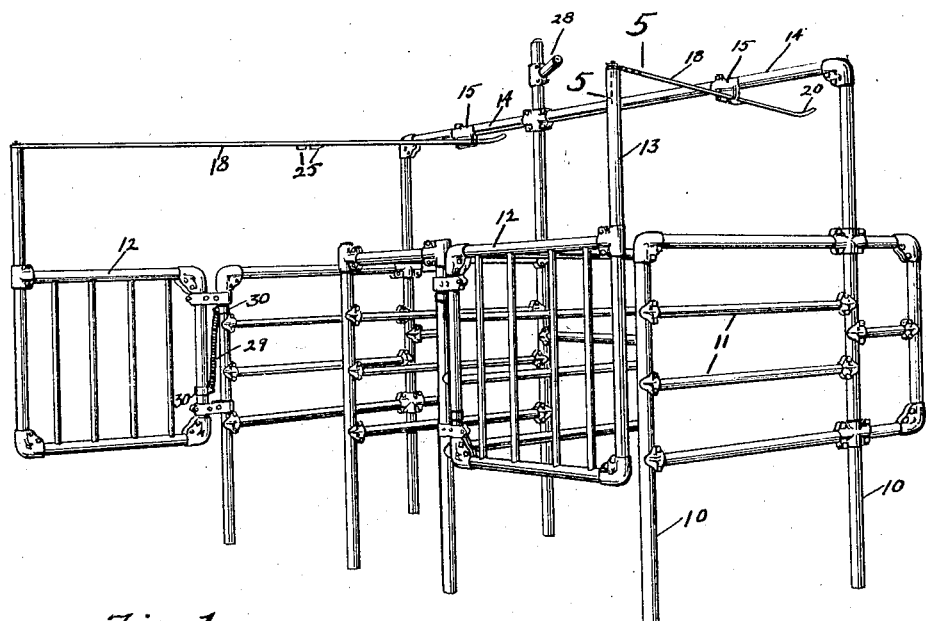
Figure 2:
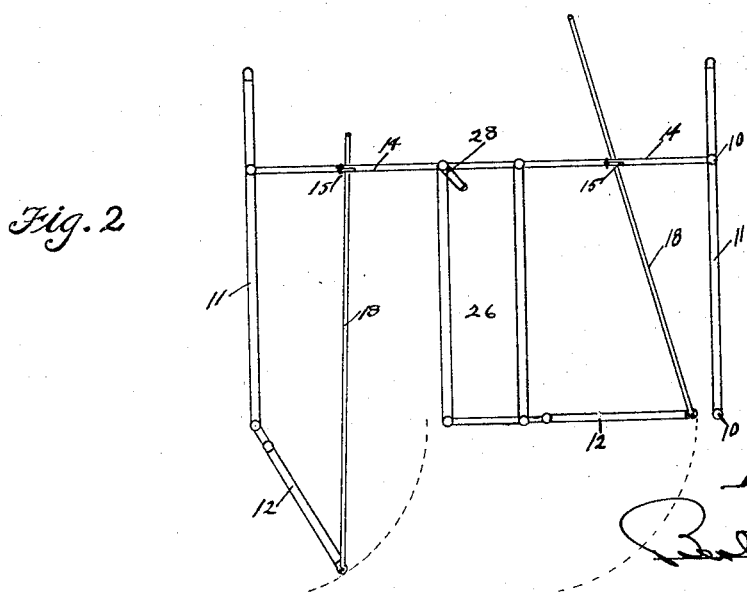
Fig. 2 is a plan view of the same showing a space between the stalls, the purpose of which will be explained herein.
Figure 3:
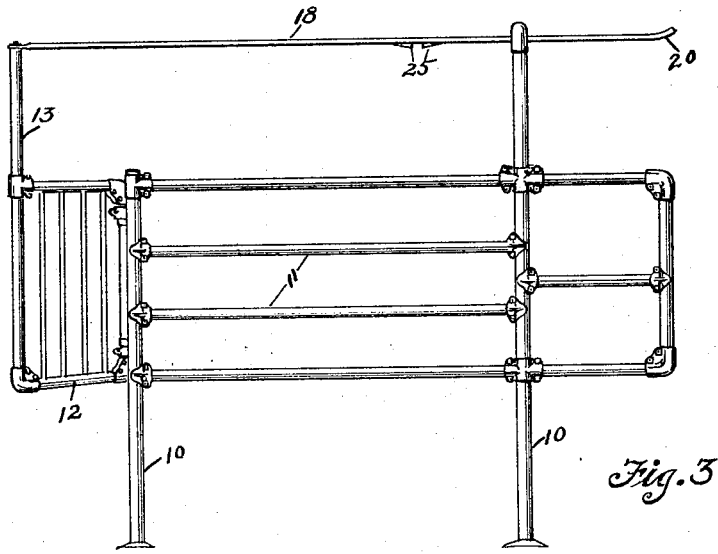
Fig. 3 is a side elevation of a stall containing my improvements.

Referring to the drawings, these show a stall having posts 10, which are connected on the sides of the stall by partition members 11. In the front of the stall is a gate 12, having one side 13 extended upwardly. Animal stalls, such as are disclosed herein, may be made of any suitable materials, but the most practical are those having a tubular structure which are shown in the drawings. The posts 10 in the rear of the stall are also provided with extensions projecting above the stall and to the extended portions of the posts of adjacent stalls, a cross member 14 is secured.

Figure 4:
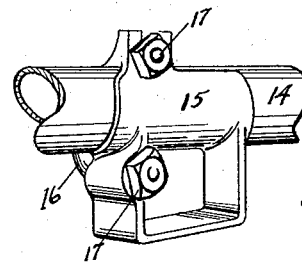
Fig. 4 is a detail view of one of the latching elements.

A member 15, provided with an opening therethrough (Fig. 4) is secured on the cross member 14 approximately above the center of the stall. It may be secured in any satisfactory manner and for this purpose I employ a U bolt 16 having nuts 17 applied on the threaded ends of the bolt. Through the opening provided in the member 15, a lever 18 is passed, the member 15 acting as a support for the lever. One end of the lever is flattened as at 19, and the opposite end is provided with a hand hold 20. The flattened end 19 has a hole formed therein for attaching the lever to the extended side of the gate.

Figure 5:
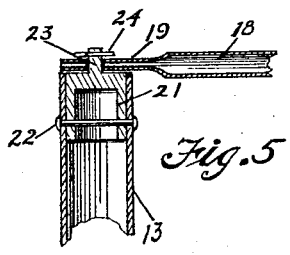
Fig. 5 is a sectional view taken on the line 5—5 of Fig. 1, showing the connection of the operating arm with the gate.

In the end of the extended side 13 of the gate a plug 21 is inserted and it is held in place by a rivet 22. The plug is provided with a circular lug 23 (Fig. 5) over which the flattened end 19 of the lever 18 is placed and is held thereon by means of a cotter pin 24.

Figure 6:
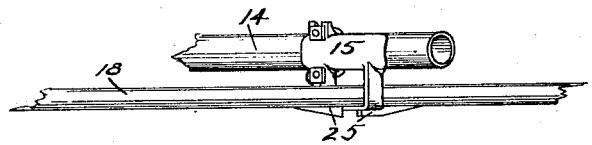
Figs. 6 and 7 are also detail views of the latching elements which will be explained at length herein.
Figure 7:
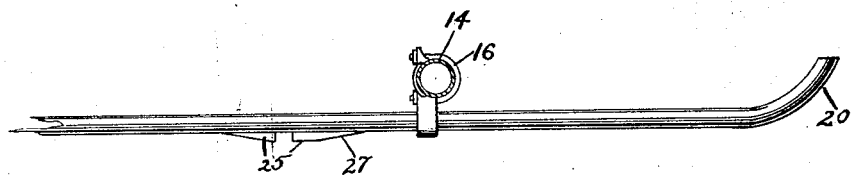

Latch blocks 25, spaced a distance apart, are attached to the under side of the lever 18 (Fig. 7). I preferably weld the blocks to the lever but they may be secured in any manner provided they are rigidly held thereon. When the gate is closed, the blocks 25 are so positioned on the lever 18 that the space between them fits into the lower side of the member 15, which acts as a latch seat for the blocks. (Fig. 6.) It will be apparent when the gate is in closed position and the latch blocks are astraddle the member 15, that the gate cannot be opened until the lever is raised upwardly so that the block can clear the member 15 as the lever is pushed forward. The block 25 positioned furthest away from the gate is provided with a sloping end 27 to permit the block to slide over the member 15 when the lever is withdrawn to close the gate. My invention can be used by having but one block on the lever 18, which when the block abuts the member 15, will prevent the gate from being opened outwardly from the stall. I prefer, however, the use of both blocks for with them the gate is locked, preventing it from being moved in either direction until the lever is released.

A space 26 may be provided between the stalls, and a milking machine (not shown) can be placed therein, which allows one machine to be used with two animals. Milking machines are ordinarily suspended from a support and I have supplied the stud 28 for this purpose.

If it is desired to have the gate close automatically to locked position after the animal has passed from the stall, this can be accomplished by employing a coiled spring 29, one end of which is attached to the post of the stall and the other end to the side of the gate by means of clips 30.

With a stall containing my invention, the animal is driven into the stall and after the milking operation is completed, the operator in the rear of the stall, by raising the lever 18 can open the gate by pushing the lever forward and thus release the animal. After it has passed through the stall, the gate will automatically close by the action of the spring 29, and after one of the blocks 25 slides over the member 15, the lever will drop, allowing the member 15 to enter the space between the blocks, thereby holding the gate in locked position. If the spring 29 is not used, the operator from the rear of the stall can close the gate by pulling the lever backwards.

It is to be understood that while I have described but one embodiment of my invention, various modifications thereof can be made without departing from the spirit and scope of the invention.

Having described the invention, what is claimed and is desired to secure by Letters Patent therefore is:

1. A stall for animals comprising a pair of posts, a gate between the posts having hinged connection with one of the posts, partition members to form the sides of the stall, and a lever connected with the gate and extending to the rear of the stall whereby the gate can be horizontally opened and closed by movement of the lever.

2. A stall for animals comprising partition members spaced a distance apart to form the sides of the stall, a gate positioned between the partition members at one end thereof and having hinged connection with one of said members, and a lever connected to the gate and extending to the rear of the stall to open and close the gate horizontally as the lever is moved.

3. A stall for animals comprising a pair of posts, a gate between the posts having hinged connection with one of the posts, partition members to form the sides of the stall, a lever connected with the gate and extending to the rear of the stall to open and close the gate, a support for the lever in the rear of the stall, and means on the lever cooperating with said support for locking the lever against movement whereby the gate can be locked when in closed position.

4. A stall for animals comprising a pair of posts, a gate between the posts having hinged connection with one of the posts, partition members to form the sides of the stall, a lever connected with the gate and extending to the rear of the stall to open and close the gate, a support in the rear of the stall through which the lever slides, and a pair of blocks spaced a distance apart on the lever for engagement with the support to prevent the lever from sliding in the support whereby the gate can be locked when in closed position.

5. In a stall for animals, the combination with the stall sides, of a gate at one end thereof, a lever connected to the gate and extending to the rear of the stall, a support for the lever having an opening through which the lever slides, and means on the lever associated with the support for preventing the movement of the lever whereby the gate can be locked when in closed position.

6. In a stall for animals, the combination with the stall sides, of a gate at one end thereof, a lever connected to the gate and extending to the rear of the stall, a support for the lever having an opening through which the lever slides, and a pair of blocks secured to the lever spaced a distance apart adapted to co-operate with the support to hold the lever from sliding movement in the support whereby the gate can be locked when in closed position.

7. In a stall for animals, the combination with the stall sides of a gate at one end thereof, a lever connected to the gate and extending to the rear of the stall, a support for the lever having an opening through which the lever slides, and a pair of blocks secured to the lever spaced a distance apart adapted to engage the support and thereby hold the gate in locked position, one of said blocks having a sloping end to facilitate engagement with the support.

8. In a stall for animals, the combination with the stall sides, of a gate at one end thereof, a lever connected to the gate and extending to the rear of the stall, a support for the lever having an opening through which the lever slides, and means secured to the lever adapted to abut against the support and prevent the gate from opening outwardly.

9. In a stall for animals, the combination with the stall sides, of a gate at one end thereof, a lever connected to the gate and extending to the rear of the stall, a support for the lever having an opening through which the lever slides, and a block secured to the lever adapted to abut against the support and prevent the gate from opening outwardly.

10. In a stall for animals, the combination with the stall sides, of a gate at one end thereof, a lever connected to the gate and extending to the rear of the stall, a support for the lever having an opening through which the lever slides, means on the lever associated with the support for preventing the movement of the lever whereby the gate can be locked when in closed position, and means for returning the gate to closed position after it has been opened.

11. In a stall for animals, the combination with the stall sides, of a gate at one end thereof, a lever connected to the gate and extending to the rear of the stall, a support for the lever having an opening through which the lever slides, means on the lever associated with the support for preventing the movement of the lever whereby the gate can be locked when in closed position, and a spring adapted to return the gate to closed position after it has been opened.

In witness whereof, I have hereunto subscribed my name.

BERTRAM D. SCOTT.